United States Patent
Davis

(10) Patent No.: US 7,840,463 B1
(45) Date of Patent: Nov. 23, 2010

(54) RETIREMENT AND FINANCIAL PLANNING CALCULATOR APPARATUS AND METHODS

(76) Inventor: Ilene Davis, 1765 Harrison St. #203, Titusville, FL (US) 32780

(*) Notice: Subject to any disclaimer, the term of this patent is extended or adjusted under 35 U.S.C. 154(b) by 97 days.

(21) Appl. No.: 11/646,884

(22) Filed: Dec. 28, 2006

Related U.S. Application Data

(60) Provisional application No. 60/754,261, filed on Dec. 28, 2005.

(51) Int. Cl.
G06Q 40/00 (2006.01)
(52) U.S. Cl. .................. 705/35; 705/30; 235/156
(58) Field of Classification Search ............ 705/35, 705/30; 235/156
See application file for complete search history.

(56) References Cited

U.S. PATENT DOCUMENTS

| | | | | |
|---|---|---|---|---|
| 3,863,060 | A | * | 1/1975 | Rode et al. .............. 708/134 |
| 3,946,218 | A | | 3/1976 | Rode et al. .............. 235/156 |
| 4,232,367 | A | | 11/1980 | Youden et al. ........... 364/408 |
| 4,486,849 | A | | 12/1984 | Harigaya et al. ......... 364/715 |
| 5,222,019 | A | | 6/1993 | Yoshino et al. .......... 364/408 |
| 5,245,536 | A | * | 9/1993 | Hsieh ...................... 705/35 |
| 5,424,966 | A | | 6/1995 | Hirayama ............. 364/709.16 |
| 7,062,458 | B2 | | 6/2006 | Maggioncalda et al. ..... 705/36 |
| 7,421,408 | B2 | * | 9/2008 | Ryder ................... 705/36 R |
| 2002/0035527 | A1 | * | 3/2002 | Corrin .................... 705/35 |
| 2004/0177022 | A1 | | 9/2004 | Williams et al. ........... 705/36 |
| 2006/0122924 | A1 | | 6/2006 | Brustkern et al. .......... 705/35 |
| 2007/0061237 | A1 | * | 3/2007 | Merton et al. .......... 705/36 R |

OTHER PUBLICATIONS

Texas Instruments or www.ti.com was archived at Jun. 18, 2003 by way of www.archive.org retrieved Jun. 5, 2005. http://web.archive.org/web/20030602132647/education.ti.com/us/product/tech/baii/features/features.html.*

Information pertaining to www.calculatorweb.com was archived on Mar. 31, 2002 at http://web.archive.org/web/20020612040333/www.calculatorweb.com/calculators/retirecalc.shtml by way of www.archive.org retrieved Nov. 26, 2008.*

Eric T Sondergeld. (Jan. 2004). Have You Done the Calculation? LIMRA's MarketFacts Quarterly, 23(1), 57. Retrieved Jul. 22, 2010.*

Kathy Yakal. (Mar. 2003). The electronic investor: Investing in (your) futures. Barron's, 83(12), T7. Retrieved Jul. 22, 2010.*

* cited by examiner

*Primary Examiner*—Narayanswamy Subramanian
*Assistant Examiner*—Kito R Robinson
(74) *Attorney, Agent, or Firm*—Brian S. Steinberger; Law Offices of Brian S. Steinberger, P.A.

(57) ABSTRACT

Systems, devices, apparatus and methods of allowing one to use a handheld type calculator and/or computer based program having factory pre-set and preprogrammed color indicia buttons/keys to allow the user to easily and quickly do a variety of specialized calculations for financial planning results that include retirement planning, wealth accumulation, pension analysis, mortgage comparison shopping and funding future education.

4 Claims, 7 Drawing Sheets

RETIREMENT AND FINANCIAL PLANNING CALCULATOR APPARATUS AND METHODS

This invention claims the benefit of priority to U.S. Provisional Application 60/754,261 filed Dec. 28, 2005, and fully incorporated herein.

FIELD OF USE

This invention relates to handheld type calculators, in particular to systems, devices, apparatus and methods for allowing a user to easily and quickly do a variety of calculations pertaining to issues related, but not limited to, retirement planning, wealth accumulation, pension analysis, mortgage comparison and education funding, with a handheld and/or computer-based calculator having pre-programmed specialized buttons.

BACKGROUND AND PRIOR ART

As American companies continue to eliminate pension benefits, many people are concerned with affording retirement and determining how much would be needed to finance a comfortable retirement. Financial planning for retirement often requires one having to go to separate specialists such as financial planners, accountants, stock brokers, mortgage brokers and the like, to get detailed and accurate information. The costs of such separate representation and engagement can be quite expensive and time consuming to have to engage multiple professionals to get the necessary financial advice.

Various surveys have found that when asked their top financial goal, a majority indicates their top goal is being able to afford a comfortable retirement, and when asked their greatest challenge with respect to retirement planning, it is calculating how much they will need to finance it.

It is a commonly accepted fact that even a person with both a pension and social security will need additional income to maintain a comfortable lifestyle. For some, that income can come from continuing to work either full or part time, but that is not an option for everyone; many Americans are unable to work in their later years due to either health issues or lack of skills needed by potential employers. But for those who do not want to depend on charity or government programs for their daily needs, the gap between benefits received and income needed requires income from personal investments.

Retirement planning calculations can be done using a financial calculator, a spreadsheet program such as Excel, a web-based calculator, or with the assistance of a financial advisor. The problem with using a financial calculator is that many users lack the knowledge of what information needs to be entered with which keys to make the calculations easy. The problem with using a spreadsheet program is that most people do not have the financial training to know what formulas to use to create the spreadsheet.

The problem with web-based calculators is that they are very generic, and either make assumptions about retirement factors that may be applicable to each user, or do not allow sources of income such as part time work, mortgages, lump sum receipts, or expenses, different inflation rates on different expenses to be entered into the calculation. The problem with using a financial advisor is that the cost for an analysis, and the potential for pressure to make investments, may be high.

An alternative to hiring professionals would require one to educate themselves in a vast number of specialties that could include buying resources such as books, CDs (compact discs), tapes, educational classes, and seminars. These educational costs would also be quite expensive and time consuming to the user.

Also, most individuals do not have the training or skills to double check professional advice and their calculations and projections. Additionally, individuals do not have the ability to double-check the results from using educational materials.

Several attempts have been made in the prior art to provide easy methods and apparatus to perform financial calculations for retirement planning, wealth accumulation, pension analysis, mortgage comparison and education funding but significant disadvantages remain.

A general-purpose calculator capable of performing interdisciplinary business calculations is described in U.S. Pat. No. 3,863,060. Although the calculator has keys that can perform the intricate calculations related to retirement planning, the use of the calculator requires substantial knowledge of the application of financial formulas.

U.S. Pat. No. 4,232,367 describes a calculator designed specifically for computing minimum principal payments for deposit into savings accounts and certificates of deposit. To perform calculations related to retirement funding needs with this calculator, if it could be done at all, would require extensive knowledge of finance and math, and an understanding of the formulas involved in retirement funding calculations.

A computer for calculating compound interest is described in U.S. Pat. No. 4,486,849. However, substantial experience and knowledge on the part of the user would be required in order to do even basic retirement funding calculations.

U.S. Pat. No. 5,222,019 describes a calculator capable of performing and displaying financial calculations, such as present and future values, related to retirement planning. But the calculator requires the user to understand what value is to be entered for each of the function keys and substantial financial knowledge on the part of the user. While the calculator appears to have the capability of doing the required calculations, it would not be easy for someone who lacked significant financial training to quickly and easily do the necessary calculations to determine retirement funding needs.

A portable electronic financial calculator and planner is described in U.S. Pat. No. 5,245,536. Although the calculator can solve problems relating to loans, savings and the like, the calculator cannot take into account the many variables related with retirement funding calculations.

U.S. Pat. No. 7,062,458 describes a computer-based method for a financial advisory system. Although the system allows users to trade off among different input decisions, it is a system regarding feasible and optimal portfolio allocations using a specified set of investment products. '458 system limits the assumptions to those of specific products. It does not allow the user to make individual assumptions or take into account other sources of retirement income that can affect the amount of personal savings needed to achieve a defined retirement goal. It takes control of the planning process away from both the advisor and the client, and focuses on a specific portfolio suggestion, not retirement calculations. Moreover, the '458 system is designed for the sophisticated financial advisor and not the casual user.

None of the above prior art provides, for a person with limited experience in the field of financial and retirement planning, the capability to perform the calculations involved in computing retirement funding needs along with the flexibility in assumptions used to make such computations. Thus, the need exists for solutions to the above problems with the prior art.

SUMMARY OF THE INVENTION

A primary objective of the present invention is to provide devices, systems, apparatus, and methods of using a handheld and/or computer-based calculator to easily and quickly perform calculations relating to retirement planning.

A secondary objective of the present invention is to provide devices, systems, apparatus and methods of using a handheld and/or computer-based calculator to easily and quickly perform calculations relating to future needs and desires in wealth accumulation.

A third objective of the present invention is to provide devices, systems, apparatus and methods of using a handheld and/or computer-based calculator to easily and quickly perform calculations relating to analysis of one's current pension, needed pension and future desired pension.

A fourth objective of the present invention is to provide devices, systems, apparatus, and methods of using a handheld and/or computer-based calculator to easily and quickly perform calculations relating to comparing mortgage plans against one another.

A fifth objective of the present invention is to provide devices, systems, apparatus and methods of using a handheld and/or computer-based calculator to easily and quickly perform calculations relating to funding future educational needs, such as college, masters programs, professional schools, and the like.

A sixth objective of the present invention is to provide devices, systems, apparatus and methods of using a handheld and/or computer-based calculator that allows individuals seeking professional financial planning advice the ability to double check a professionals' calculations, projections and advice.

A seventh objective of the present invention is to provide devices, systems, apparatus and methods of using a handheld and/or computer-based calculator that allows individuals using financial planning educational materials the ability to double check the calculations, projections and advice gleamed from the educational materials.

A preferred embodiment of a handheld financial planning device can include a housing having dimensions that allow the housing to be held in a single hand, a display screen, and depressible color coded switches to instantly calculate financial planning results so that the calculator is used without additional resources to provide financial planning data for a user, the color coded switches including at least three different colors.

The handheld device can further include Off and On switches, Clear and Clear Entry switches, arithmetic function switches selected from at least one of: addition, subtraction, multiplication, and division, and a ten key numeric keypad of switches for the integers 0, 1, 2, 3, 4, 5, 6, 7, 8, and 9.

The handheld device can further include a plurality of switches of varying indicia and colors for providing different financial planning results. The switches can include data entry switches, calculate switches, and one multi-color function switch. The depressible switches can include of a set of switches of a single color to calculate the future value of a current known amount. The depressible switches can further include a set of switches of a single color and the multicolor function switch to calculate the present value of a future amount. The depressible switches can further include of a set of switches of a single color and the multicolor function switch to calculate the future value of an annual investment. The depressible switches can further include a set of switches of a single color and the multicolor function switch to calculate the present investment amount required to generate a future income stream. The depressible switches can further include a set of switches of a single color and the multicolor function switch to calculate a future spending stream based on a present or future amount.

A preferred method of using a handheld device to calculate financial planning with pre-programmed sets of depressible button switches, can include the steps of providing a handheld housing having a display screen and depressible button switches; and calculating financial planning results by depressing selected depressible button switches.

The method can further include four sets of depressible buttons switches, each set of a different color, and one multicolor switch. The step of calculating can include the steps of calculating the future value of a current known amount by depressing a set of depressible button switches of the same color. The step of calculating can include the steps of calculating the present value of a future amount by depressing a set of depressible button switches of the same color and by depressing the multicolor switch. The step of calculating can include the steps of calculating the future value of an annual investment by depressing a set of depressible button switches of the same color and by depressing the multicolor switch. The step of calculating can include the steps of calculating the present investment amount required to generate a future income stream by depressing a set of depressible button switches of the same color and by depressing the multicolor switch. The step of calculating can include the steps of calculating the future spending stream based on a present or future amount by depressing a set of depressible button switches of the same color and by depressing the multicolor switch.

A preferred method for calculating financial information utilizing a handheld electronic apparatus, can include the steps of inputting data through a plurality of depressible button switches on the apparatus, selecting a financial function from a plurality of financial functions to be carried out by the electronic apparatus, and generating and displaying results of the financial function on a display device. Selecting can occur by depressing a set of similarly colored depressible button switches on the apparatus. The financial function can be to calculate the future value and/or present value of a current known amount. Selecting can occur by depressing a multicolored button switch on the apparatus. The financial function can be to calculate the future value of an annual investment. The financial function can be to calculate the present investment amount required to generate a future income stream. The financial function selected can be to calculate a future spending stream based on a present or future amount.

Further objects and advantages of this invention will be apparent from the following detailed description of the presently preferred embodiments which are illustrated schematically in the accompanying drawings.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

For calculating retirement funding needs—in particular, how much an individual/family needs in personal investments or part time work to finance their retirement spending needs, there are five basic factors.

Figure 1:
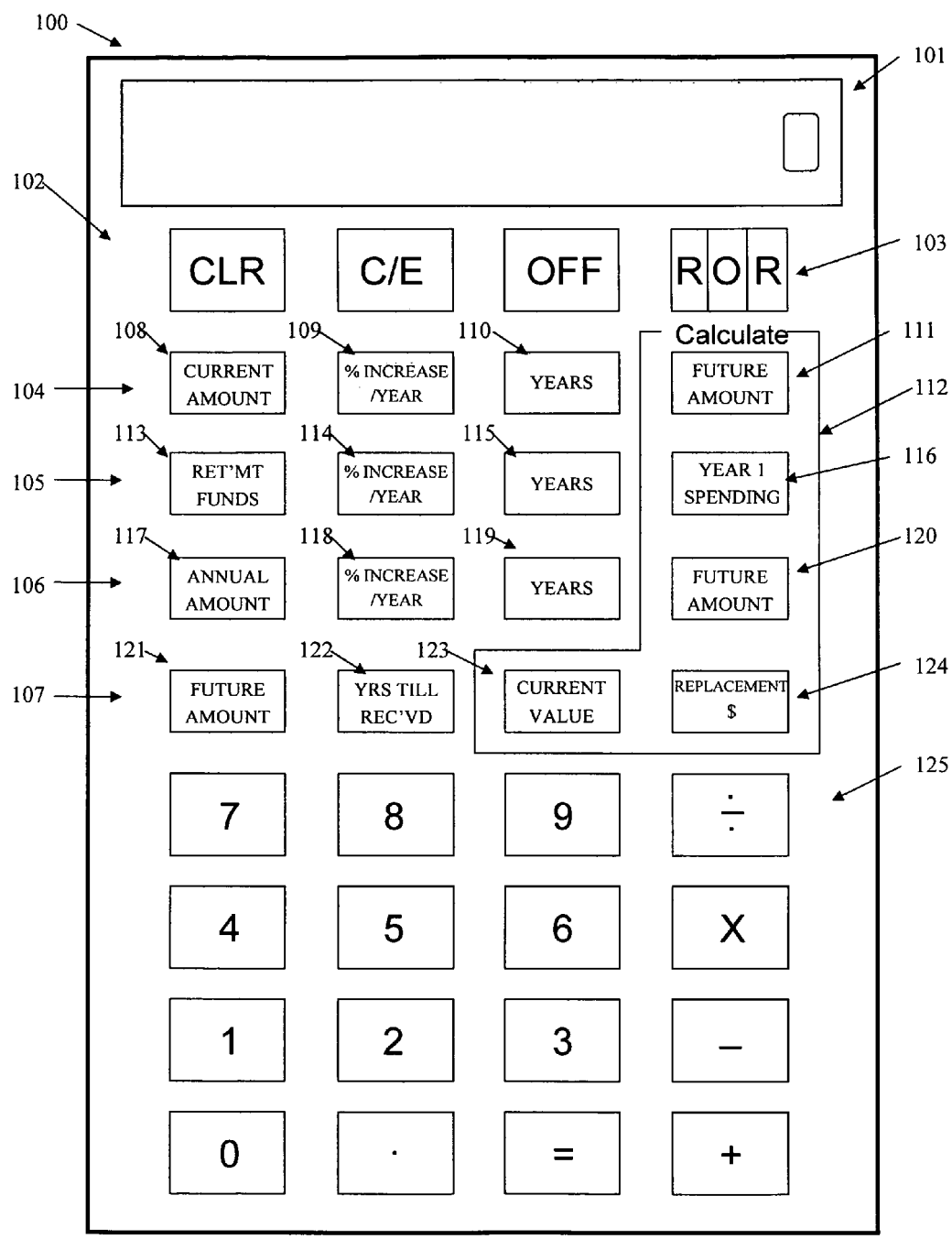
FIG. 1 shows the front of a novel handheld and/or computer-based calculator with specialized buttons.

1. how long funds will be needed to finance retirement needs (years of retirement)
2. the amount of income needed each year (annual expenses)
3. The assumed inflation rate
4. the assumed rate of return money invested will earn
5. other sources of income As shown in FIG. 1, a preferred embodiment of the handheld calculator is a housing 100 that can fit within and/or be held and operated by the single hand of a user. The novel handheld calculator 100 can be battery powered, have cigarette lighter power adapters, 120 volt power supply adapters and/or be solar powered, and the like. Additionally, the novel calculator 100 has an easy to read display screen 101 such as but not limited to an LCD (liquid crystal display) and the like.

The novel calculator includes standard calculator keys 102 including OFF/ON, CLR, C/E, arithmetic functions (addition, subtraction, multiplication, division), equals (=), and a 10-key numeric keypad (0, 1, 2, 3, 4, 5, 6, 7, 8, 9).

The preferred embodiment of the Calculator has seventeen additional keys that are color-coded and for which each separate "color set" is designed to perform very specific functions.

A row of yellow keys 104 includes: CURRENT INCOME 108, % INCREASE/YEAR 109, YEARS 110, and FUTURE INCOME 111. A row of blue keys 105 includes: RET'MT FUNDS 113, % INCREASE/YEAR 114, YEARS 115, and YEAR 1 SPENDING 116. A row of green keys 106 includes: ANNUAL AMOUNT 117, % INCREASE/YEAR 118, YEARS 119 and FUTURE AMOUNT 120. A partial row of red keys 107 includes: FUTURE AMOUNT 121, YRS TILL REC'VD 122, and CURRENT VALUE 123. The final key in the partial row of red keys 107 is a green key: REPLACEMENT $ 124.

The yellow FUTURE AMOUNT key 111, blue YEAR 1 SPENDING key 116, green FUTURE AMOUNT key 120, red CURRENT VALUE key 123, and green REPLACEMENT $ key 124 are bordered by a white line 112 designated the Calculate area.

Names of certain buttons can be repeated for different color-coded sets of keys. For example, % INCREASE/YEAR appears as the name of a yellow 109, blue 114, and green 118 key and in each case primarily represents the same thing—Inflation rate. The same applies with the YEARS key, where there is a yellow 110, blue 115, and green 119 key. This is done specifically to make it easier to use even for novices.

In the preferred embodiment of the present invention, there is a multi-color ROR key 103 with adjacent vertical green, red, and blue color bands, in addition to the four yellow, five green, four blue, and three red color-coded sets of keys. Each color-coded set of keys can be specifically set for specific types of calculations.

The yellow CURRENT AMOUNT key 108 can represent current income, current spending needs, or the current amount or value of an investment. It can represent the current cost of college.

The numeric value entered with the yellow % INCREASE/YEAR key 109 can represent inflation, an investment rate of return, or the estimated cost of living increase that may be more or less than the assumed inflation rate. The value entered using this key will only be used for the computation made when the yellow FUTURE AMOUNT 111 is pressed. The only limitation is the increase/year must be a uniform rate through the period of years designated by the yellow YEARS key 110, or individual calculations will need to be made for each different rate by breaking the calculation into multiple sections. For example, if an investment were expected to grow at one rate for 10 years, and at another rate for 12 years, instead of entering one rate for 22 years, one would calculate the 10-year value, and then separately calculate the 12-year value.

The yellow YEARS key 110 represents the number of years between the year the "current" amount refers to, and the number of years after that current year for which the value is to be calculated The yellow FUTURE AMOUNT key 111 initiates the calculation of the future amount and uses ONLY the information supplied using the other yellow keys to compute the value of a known amount at a specified number of years in the future, or the inflation adjusted cost of a current expense at a specified number of years in the future. Data entered using the blue, red, green, or tri-color ROR key 103 is not used.

The blue RET'MT FUNDS key 113 represents funds available for retirement, or it can represent assets available for gifting.

The numeric value entered with the blue % INCREASE/YEAR key 114 can represent inflation, or an increase from the prior year in the amount to be withdrawn that may be more or less than the assumed inflation rate. The value entered using this key will only be used for the computation made when the blue YEAR 1 SPENDING key 116 is pressed. The only limitation is the increase/year must be the same percentage a uniform rate through the period of years designated by the blue YEARS key 115, or individual calculations will need to be made for each different rate by breaking the calculation into multiple sections. For example, if withdrawals were expected to grow at one rate for 10 years, and at another rate for 12 years, instead of entering one rate for 22 years, you would calculate the 10-year value, and then separately calculate the 12-year value.

The blue YEARS key 115 represents the number of years that the money needs to last at the specified withdrawal rate, with the assumption that monies entered using the blue RET'MT FUNDS key 113 will be depleted at the end of the years specified.

The blue YEAR 1 SPENDING key 116 initiates the computation of the year 1 withdrawal amount and uses ONLY the information supplied using the blue data keys 105, and the tri-color ROR key 103.

The green ANNUAL AMOUNT key 117 can represent a variety of variables including but not limited to: annual expenses, annual investment amount, annual college cost, annual social security benefit, annual income from part time work, annual pension amount, annual health care costs, annual mortgage expense, annual rental income, annual maintenance costs, or the like.

The green % INCREASE/YEAR key 118 can represent annual rate of increase in investment amounts, increase in annual spending, increase in cost of college, increase in health care costs or other expenses, increase in pension, increase in social security, or the like. The only limitation is the increase/year must be the same percentage a uniform rate through the period of years designated by the green YEARS key 119, or individual calculations will need to be made for each different rate by breaking the calculation into multiple sections. For example, if an investment were expected to grow at one rate for 10 years, and at another rate for 12 years, instead of entering one rate for 22 years, one would calculate the 10-year value, and then separately calculate the 12-year value.

The green YEARS key 119 represents the number of years that invested money will have to compound, or a benefit (such as social security or pension) will be received, or a specified level of income will be needed.

The green FUTURE AMOUNT key 120 initiates the computation of a future value of a multiple years of investment increasing at a specified and uniform rate based on date amount and uses ONLY the information supplied using the green data keys 106, and the tri-color ROR key 103.

The green REPLACEMENT $ key 124 initiates the computation of the amount that would need to be invested at the specified rate of return to generate a specified stream of income, increasing at a fixed rate per year for the period of the calculation, and uses ONLY the information supplied using the green data keys 106, and the tri-color ROR key 103. If, for example, withdrawals were to increase at one rate for 10 years, and at another rate for 12 years, instead of entering one rate for 22 years, one would calculate the amount needed to generate the level of income for 10 years, then the amount needed to generate the income specified for the following 12 years.

The red FUTURE AMOUNT key 121 is used to enter the cost of something to be purchased or value of something to be received. It could represent future social security benefits, a future inheritance, a balloon payment, a future amount of savings, or the like.

The red YRS TILL REC'VD key 122 represents the number of years between when an amount will be needed or received, and a specified number of years prior to that year.

The red CURRENT VALUE 123 key initiations the calculation of the amount that would need to be invested to be worth the future value in the specified number of years at the specified rate, or how much in current dollars a future amount would be worth when adjusted for inflation and uses ONLY the information supplied using the red data keys 121, 122, and the tri-color ROR key 103.

The green/red/blue tri-color ROR key 103 can be used to enter either a discount rate, rate of return on an investment, or an inflation (increase in cost of living) rate, depending on which is relevant to the calculation. This key is an essential part of computations made with the blue, green and red keys.

Calculating retirement funding needs involves one or more of four basic calculations: the future value of a single amount, the present value of a single amount, the future value of multiple years of investments, and the present value of a multiple-year stream of expenses or benefits. The color-coded sets of keys on the calculator are specifically designed to perform these functions.

The yellow keys are used to calculate the future value of a current known amount.

The red keys are used to calculate the present, or earlier value, of an amount to be received 1 or more years in the future.

The green keys are used to calculate either the future value of annual investments of 2 or more years, or the amount that would need to be invested to generate income, or finance expenses, for 2 or more years.

The blue keys are specifically designed to quickly and easily answer the question often asked by the person ready to retire: "I have $XX amount available for retirement. How much can I afford to spend a year without running out of money?"

The color coded buttons in the handheld calculator are factory pre-set and pre-programmed so that the user can not modify their features, and cannot modify the calculations. Thus, the handheld color buttons are restricted to only the use described. The rest of calculator buttons (i.e. arithmetic, integer numbers . . . ) can be used for standard ten key calculator functions without having to access the color coded buttons.

Figure 2:
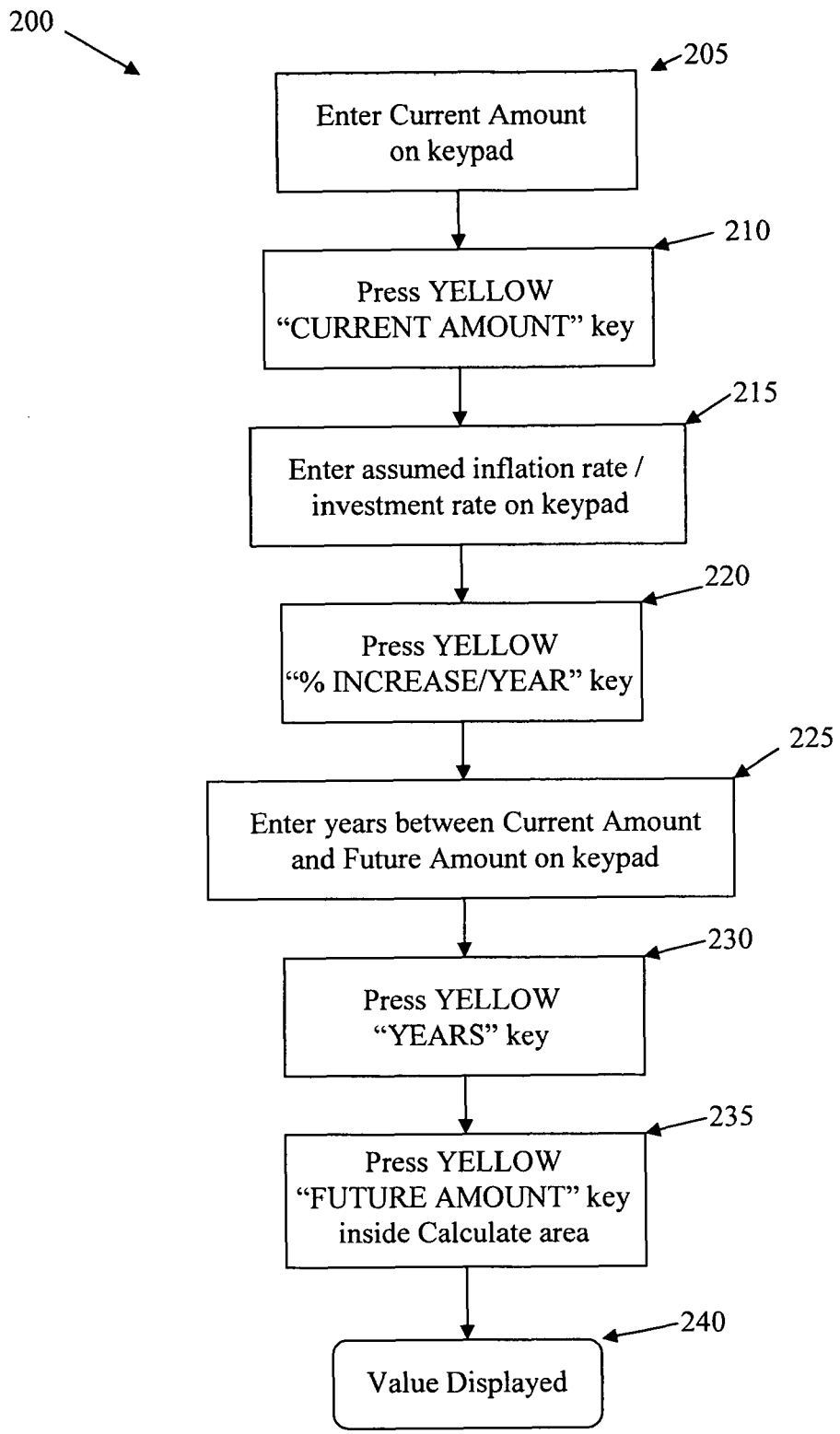
FIG. 2 is a block diagram to calculate the inflation or rate of return adjusted future value of a current single amount.

FIG. 2 shows a block diagram 200 for using the yellow keys of the preferred embodiment of the present invention to calculate the future value of a current single amount. Using the numeric keypad 125, enter the numeric value 205 to be used as current amount. Press the yellow CURRENT AMOUNT key 210. Using the numeric keypad 125, enter the numeric value of either the assumed inflation rate 215, or the assumed investment rate during the years involved. Press the yellow % INCREASE/YEAR key 220. Using the numeric keypad 125, enter the numeric value 225 equal to the years between the year the current amount is to be valued, and the year the future amount is to be valued. Press the yellow YEARS key 230. Press the yellow FUTURE AMOUNT key 235 that is located inside the white line 112 labeled "Calculate". The value displayed 240 is the equivalent value of the current amount entered adjusted for inflation or rate of return specified by the yellow % INCREASE/YEAR key 109 over the years specified by the yellow YEARS key 110.

Figure 3:
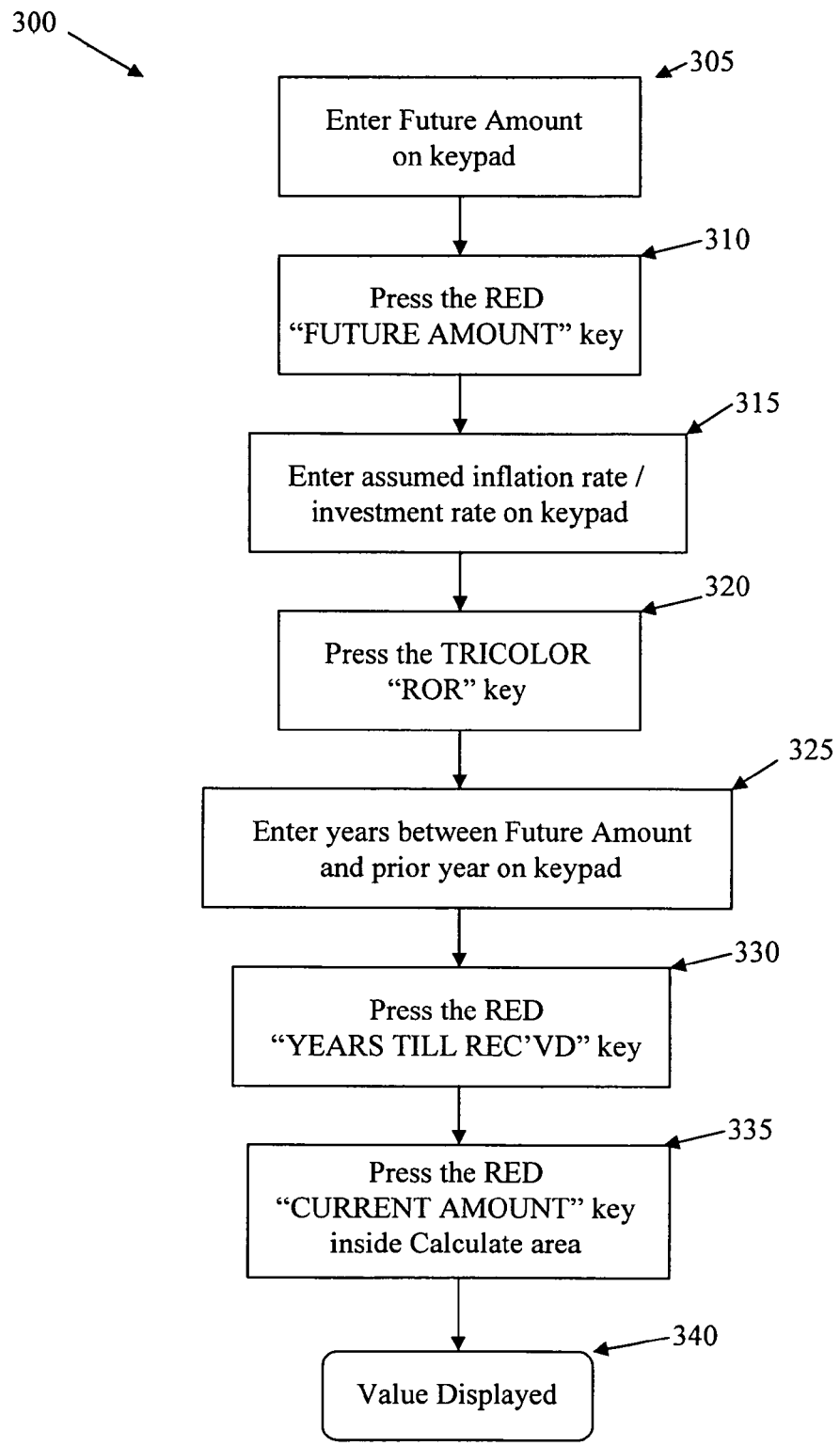
FIG. 3 is a block diagram to calculate an inflation or rate of return adjusted earlier value of a future single amount.

FIG. 3 shows a block diagram 300 for using the red keys to calculate an earlier value of a future single amount. Using the numeric keypad 125, enter the numeric value 305 to be used as future amount. Press the red FUTURE AMOUNT key 310. Using the numeric keypad 125, enter the numeric value 315 of either the assumed inflation rate, or the assumed investment rate during the years involved. Press the tricolor ROR key 320. Using the numeric keypad 125, enter the numeric value 325 equal to the years between the year the future amount is to be received and the year for valuation Press the red YRS TILL REC'VD key 330. Press the red CURRENT VALUE key 335 that is located inside the white line 112 labeled "Calculate". The value displayed 340 is the equivalent value of the future amount entered adjusted for inflation or rate of return specified by the tricolor ROR key 103 for the years prior referenced by the red YRS TILL REC'VD key 122.

Figure 4:
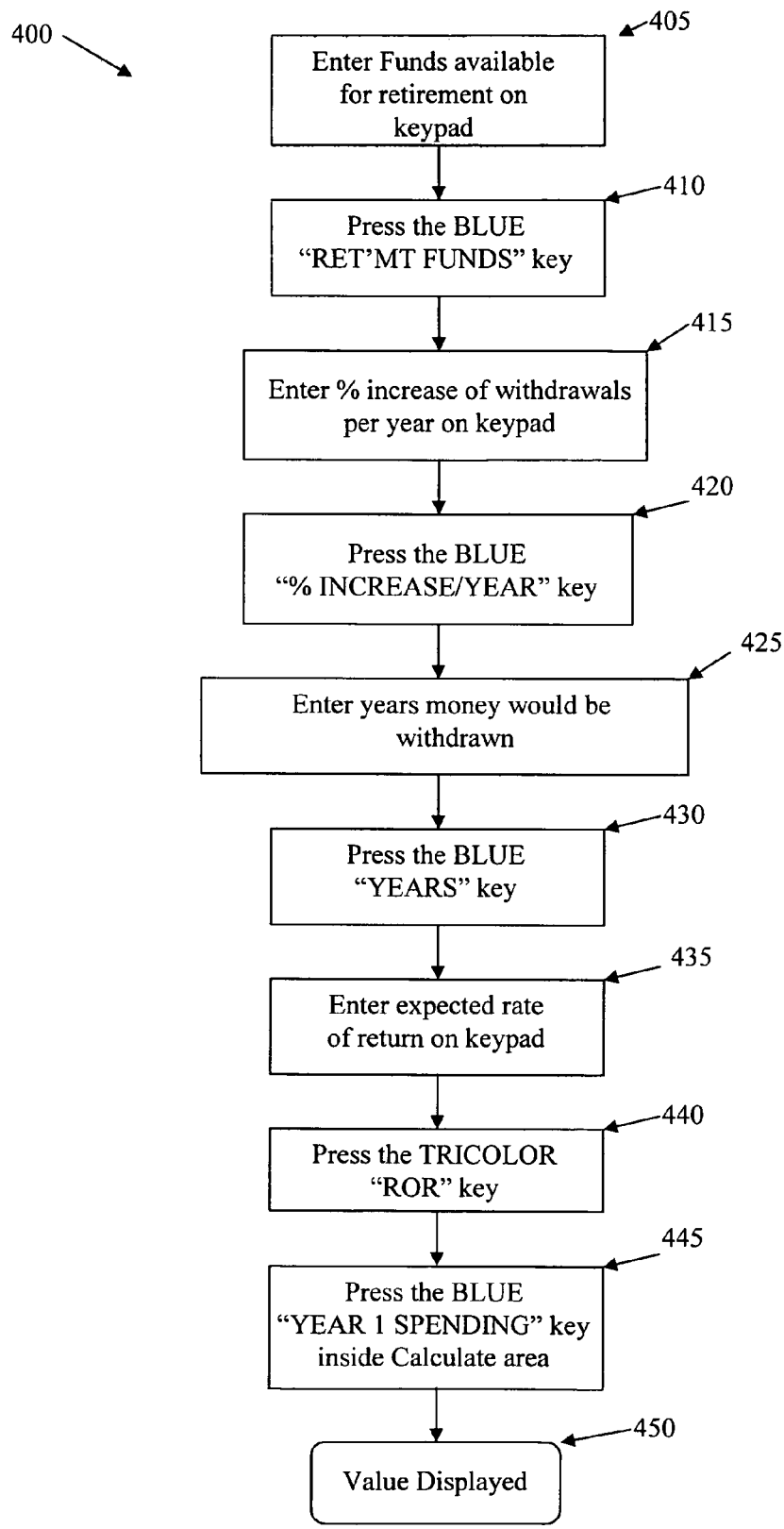
FIG. 4 is a block diagram to calculate the inflation or rate of return adjusted amount that could be spent based on retirement resources available.

FIG. 4 shows a block diagram 400 for using the blue keys to calculate "how much could be spent" based on the retirement resources available. Using the numeric keypad 125, enter the numeric value 405 to be used as funds available to finance retirement spending. Press the blue RET'MT FUNDS key 410. Using the numeric keypad, enter the numeric value 415 of the amount in percent that withdrawals would increase each year throughout the retirement years. Press the blue % INCREASE/YEAR key 420. Using the numeric keypad 125, enter the numeric value 425 for the number of years the money would need to be available to withdraw the specified amount. Press the blue YEARS key 430. Using the numeric keypad 125, enter the numeric value 435 of the rate of return that investments are expected to earn throughout retirement. Press the tricolor ROR key 440. Press the blue YEAR 1 SPENDING key 445 that is located inside the white line 112 labeled "Calculate". The value displayed 450 is the amount that could be spent in year 1 that increased each year by the percent specified by blue % INCREASE/YEAR key 114 with funds invested at the rate specified by the tricolor ROR key 103 that would last for the years specified by the blue YEARS key 115.

Figure 5:
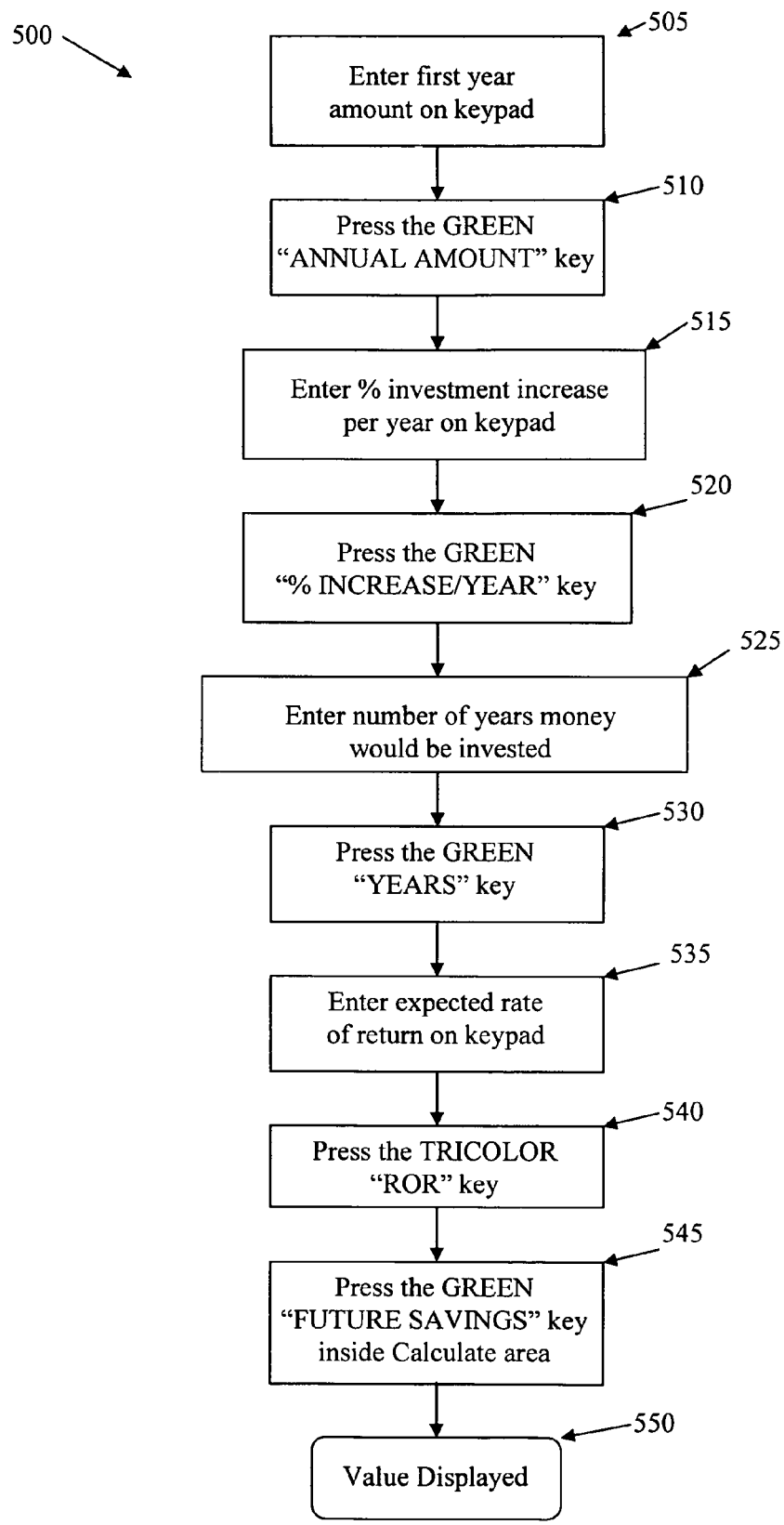
FIG. 5 is a block diagram to calculate the future inflation or rate of return adjusted value of more than one year of investments.

FIG. 5 shows a block diagram 500 using the green keys to calculate the future value of more than one year of investments. Using the numeric keypad 125, enter the numeric value 505 that would represent the first year annual investment, withdrawal, or cost value. Press the green ANNUAL AMOUNT key 510. Using the numeric keypad 125, enter the numeric value 515 of the amount in percent that the investment, cost, or withdrawal amount would increase each year through the years specified. Press the green % INCREASE/YEAR key 520. Using the numeric keypad 125, enter the numeric value 525 of the number of years the annual amount would be invested, needed, or used. Press the green YEARS key 530. Using the numeric keypad 125, enter the numeric value 535 of the rate of return that money invested is assumed to earn through the number of years specified by the green YEARS key 119. Press the tricolor ROR key 540. Press the green FUTURE SAVINGS key 545 that is located inside the white line labeled "Calculate". The value displayed 550 is the amount that would be accumulated by the end of the number of years entered based on the values entered using the green ANNUAL AMOUNT key 117, % INCREASE/YEAR key 118, and YEARS key 119 at the rate of return specified using the tricolor "ROR" key 103.

Figure 6:
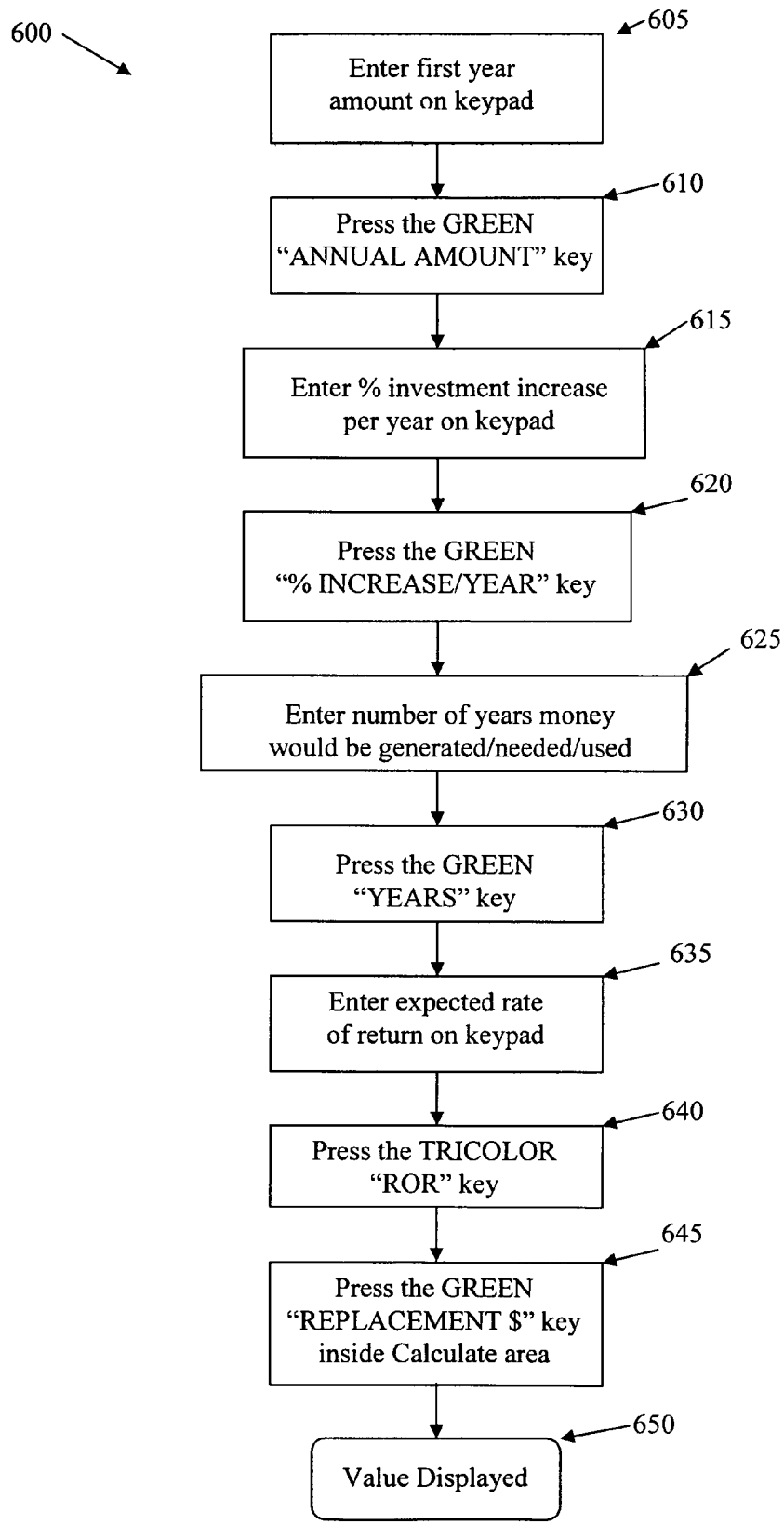
FIG. 6 is a block diagram to calculate the investment needed to generate a specified inflation or rate of return adjusted multiple year stream of funds.

FIG. 6 shows a block diagram 600 using the green keys to calculate the investment needed to generate a specified multiple year stream of funds. Using the numeric keypad 125, enter the numeric value 605 that would represent the first year investment, withdrawal, or cost value. Press the green ANNUAL AMOUNT key 610. Using the numeric keypad 125, enter the numeric value 615 of the amount in percent that the investment, cost, or withdrawal would increase each year through the years specified. Press the green % INCREASE/YEAR key 620. Using the numeric keypad 125, enter the numeric value 625 of the number of years the annual amount would be invested, needed, or used. Press the green YEARS key 630. Using the numeric keypad 125, enter the numeric value 635 of the rate of return that money invested is assumed to earn through the number of years specified by the green YEARS key 119. Press the tricolor ROR key. Press the green REPLACEMENT $ key 645 that is located inside the white line 112 labeled "Calculate". The value displayed 650 is the amount that would need to be invested at the rate of return specified by the tricolor "ROR" key 103 to generate the amount specified using the green ANNUAL AMOUNT key 117 for the years specified by the green YEARS key 119, assuming this amount was invested at the rate specified by the tricolor ROR key 103.

Figure 7:
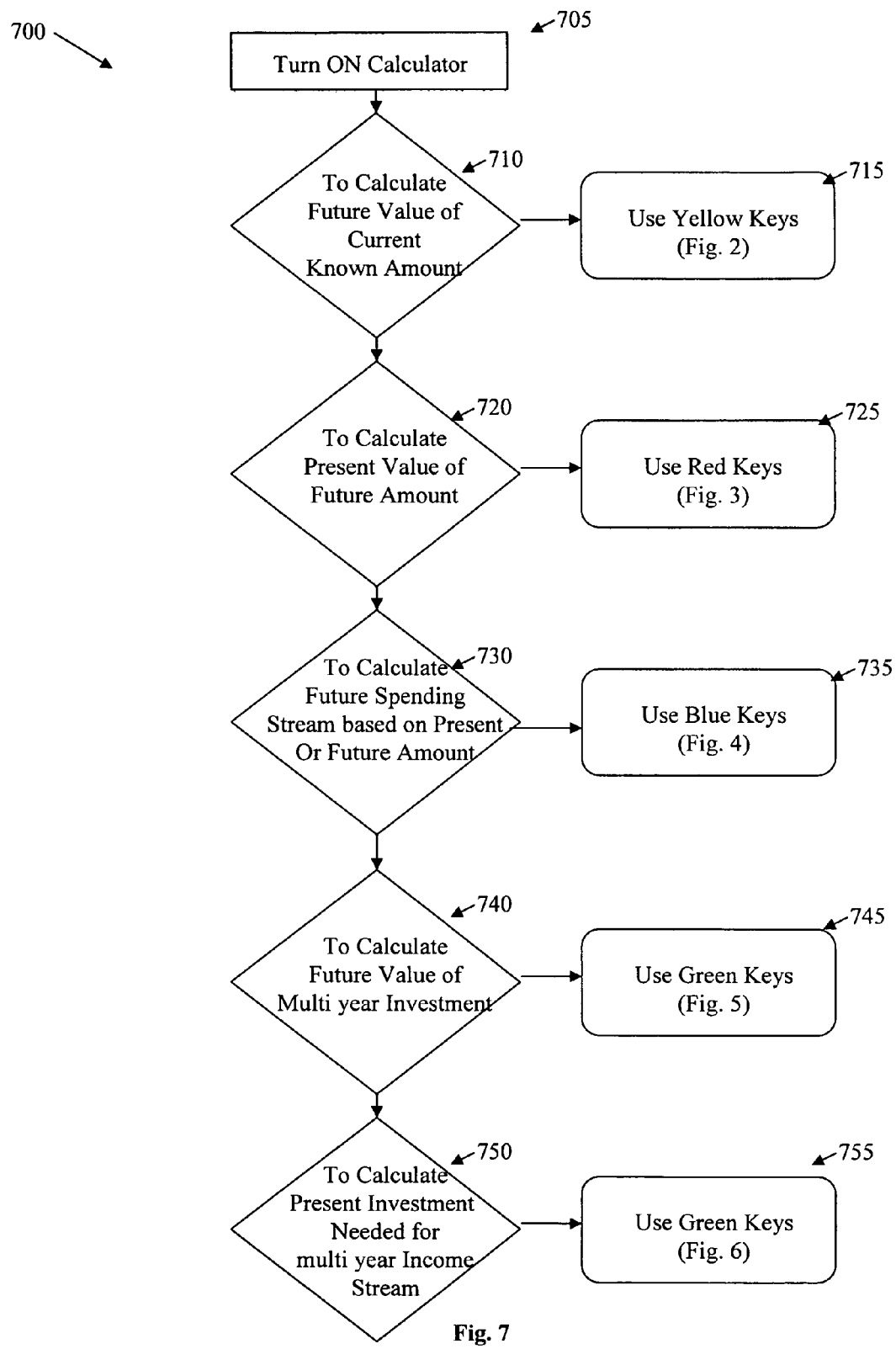

FIG. 7 shows a block diagram representation 700 of the specialized financial calculations available on the novel calculator. After the calculator is turned ON 705, if the user wishes to calculate the future value of a current known amount 710, then the user will use the yellow keys 715 as shown in FIG. 2. If the user wishes to calculate the present value of a future amount 720, then the user will use the red keys 725 as shown in FIG. 3. If the user wishes to calculate the future spending stream based on a present or future amount 730, then the user will use the blue keys 735 as shown in FIG. 4. If the user wishes to calculate the future value of an annual investment 740, the user will then use the green keys 745 as shown in FIG. 5. If the user wishes to calculate the present investment amount required to generate a future income stream 750, the user will then use the green keys 755 as shown in FIG. 6.

The yellow set of keys can be used to calculate the future equivalent income needed at a specified number of years in the future to maintain inflation adjusted purchasing power equivalent to a current year amount. For example, Joe is 45 and wants to retire in 20 years. He estimates inflation over the next 20 years will average 3%. He wants to know how much income he would need a year at age 65 to have the same purchasing power as $50,000 has today (at age 45). The calculation process would be done as follows: Using the yellow keys, enter 50000 as CURRENT AMOUNT. Enter 3 as % INCREASE/YEAR. Enter 20 as YEARS. Pressing the FUTURE AMOUNT key will display an amount of 90305.561. This means that Joe would need $90,305.56 per year in income at age 65 to have the same purchasing power as $50,000 had at age 45, based on a 3% inflation rate.

Also, the yellow set of keys can be used to calculate the future value of a current amount invested at a specified rate for a specified number of years. For example, Joe is 45 and wants to retire in 20 years. He has $150,000 in retirement funds. He wants to know how much his $150,000 would be worth at age 65 assuming it earned 7% per year for the next 20 years. In this case, current investment would be entered as current amount, and the estimated 7% annual rate of return would be entered as % increase/year. The calculation process would be done as follows: Using the yellow keys, enter 150000 as CURRENT AMOUNT. Enter 7 as % INCREASE/YEAR. Enter 20 as YEARS. Pressing the FUTURE AMOUNT key will display an amount of 580452.66. Thus means that if Joe's $150,000 earned 7% a year, 20 years later it would be worth $580,452.66. Joe needs only know to use the yellow keys to calculate the future value of a lump sum or one year of income.

The green set of keys, in conjunction with the tri-color ROR key, can be used to calculate (but not necessarily limited to) the present (replacement) value of a multi-year stream of income to be received. For example, Bob wants to retire next year. He wants to know how much money he would need to invest to be able to withdraw $30,000 next year, 3% more each year of retirement, and have enough money to last 30 years. He assumes he will earn 6% on his investments. To compute how much he would need to invest, using the green keys and the tri-color ROR key, he would enter 30000 as ANNUAL AMOUNT, 3 as % INCREASE/YEAR, 30 as YEARS, and 6 as ROR. Pressing the REPLACEMENT $ key would generate a display 612032.35419. This means Bob would need to invest $612,032.35 to be able to withdraw the specified amount for 30 years. At the end of 30 years, his savings investment would have been depleted.

The green set of keys, in conjunction with the tri-color ROR key, can also be used to calculate the future value of a multi-year investment program of either a fixed amount, or an amount that is increasing by the same percentage per year. For example, Barbara wants to retire in 20 years. She wants to know how much money she would accumulate if she invested $5,000 this year, and increased her investments by 5% each year for the next 20 years, assuming her investments earned 6%. To compute how much she would accumulate, using the green keys and tri-color ROR key, she would enter 5000 as ANNUAL AMOUNT, 5 as % INCREASE/YEAR, 20 as YEARS, and 6 as ROR. Pressing the FUTURE AMOUNT key would generate a display of 276918.8835. Based on this investment plan, Barbara would accumulate $276,918.88 over the 20 years specified as shown in column 3 of Table 1. Barbara could then use the blue keys to calculate how much this amount of investment would allow her to withdraw each year.

The blue set of keys, in conjunction with the tri-color ROR key can be used to calculate how much a person could afford to withdraw per year based on the amount invested, the years the money needs to last, the rate of withdrawal increase, and the invested rate of return. For example, Barbara's proposed savings plan, as described in the preceding paragraph, would accumulate to $276,918.88. Barbara wants to increase her withdrawal by 4% per year, and wants it to last 20 years. She continues to assume her investments will earn 6% a year. To compute how much she could afford to withdraw in year 1 of retirement, using the blue keys and tri-color ROR key, she would enter 276918.88 as RET'MT FUNDS, 4 as % INCREASE/YEAR, 20 as YEARS, and 6 as ROR. When the blue YEAR1 SPENDING key is pressed, the amount displayed is $16,492.82. This is the amount she can withdraw in year 1, withdrawing 4% more each year, and have her money last for 20 years based on the 6% rate of return on the remaining investment balance as shown in the fifth column of Table 1.

TABLE 1

| Year | Yearly Investment | Accumulated Funds | Yearly Spending | Retirement Funds left |
|---|---|---|---|---|
| 1 | 5000 | 5000 | 16493 | 276052 |
| 2 | 5250 | 10550 | 17153 | 274433 |
| 3 | 5513 | 16696 | 17839 | 271990 |
| 4 | 5788 | 23485 | 18552 | 268644 |
| 5 | 6078 | 30972 | 19294 | 264311 |
| 6 | 6381 | 39212 | 20066 | 258900 |
| 7 | 6700 | 48265 | 20869 | 252313 |
| 8 | 7036 | 58196 | 21703 | 244446 |
| 9 | 7387 | 69075 | 22572 | 235187 |
| 10 | 7757 | 80977 | 23474 | 224415 |
| 11 | 8144 | 93980 | 24413 | 212002 |
| 12 | 8552 | 108170 | 25390 | 197809 |
| 13 | 8979 | 123640 | 26406 | 181687 |
| 14 | 9428 | 140486 | 27462 | 163479 |
| 15 | 9900 | 158815 | 28560 | 143014 |
| 16 | 10395 | 178739 | 29703 | 120110 |
| 17 | 10914 | 200377 | 30891 | 94572 |
| 18 | 11460 | 223860 | 32126 | 66193 |
| 19 | 12033 | 249325 | 33411 | 34748 |
| 20 | 12635 | 276919 | 34748 | 0 |

The red set of keys, in conjunction with the tri-color ROR key, can be used to calculate the discounted value of a single lump sum to be received in the future. It can also be used, in conjunction with the green keys, to calculate the discounted value of a multi-year stream of monies that would start at a future date. For example, Tim wants to retire at 65. He will receive a lump sum of $250,000 when he is 75, but he knows that to more accurately estimate retirement needs, he needs to know what that $250,000 would be worth at the start of his retirement (10 years earlier). For all his other retirement calculations, he is estimating a 6% rate of return on his investments. Using the red keys and the tri-color ROR key, he would enter 250000 as FUTURE AMOUNT, 10 as the YEARS TILL REC'VD, and 6 as the ROR. When the red CURRENT VALUE key is pressed, the amount displayed is 139598.69. This represents the amount that would need to be invested to compound to $250,000 in 10 years, which is the same amount that Tim would be able to count as part of his retirement savings as of the start of retirement . . . part of the "green key amount" he would not have to accumulate himself since it will be provided by outside sources.

The novel invention can be used by professionals in the financial planning areas, such as accountants, stock brokers, mortgage brokers, realtors, estate attorneys, financial planners, and the like.

With the novel invention even financial novices can compare pension choices versus lump sum, mortgages of different point/interest rate combinations, etc. Furthermore, the calculator can be used for computations such as: retirement funding needs, college funding needs, annual payments need to repay a loan, gifting decisions (i.e., will making a gift of assets that put spending plans at risk), divorce analysis (i.e., does the couple have enough assets to finance each of their income needs, how much would be needed to provide for long term needs of a dependent), rate of return required to achieve a specified stream of income, insurance needs, comparison of different pension options, comparison of different mortgage options, analysis of lump sum versus payment plan, and to evaluate/analyze long term care funding.

The present invention provides the following benefits in comparison with alternative means of calculating retirement funding needs: the average user needs little training to use the calculator to determine retirement funding needs; no financial training or investment experience is needed; changes in tax laws do not require new software; access to the internet is not needed; they are no annual fees for use; ease of use; flexibility; the same calculator can be used for calculating retirement, college funding, comparing pension options; it allows user to analyze accuracy of advice from professional advisors; it allows user to easily compare lump sum versus monthly pension options; it allows user to quickly compare wealth accumulation or investment needs based on different years, investment returns, or amount invested; calculations can be done at any day or time; the calculator can be downloaded to a PDA; the assumptions used are at total discretion of user, that is, it uses no pre-defined assumptions that may not apply universally; it allows the user to calculate "retirement value" of single or limited years of income or expenses; it allows the user to calculate values of future lump sum income or expenses; it allows the user to use different cost of living/inflation rates for different expenses or sources of income; the format of the calculator is designed for easy of use; and the data keys are clearly defined in common terms (current amount, increase/year, years, future amount, annual amount, replacement $, ROR [rate of return], Years 'til received).

Although the preferred embodiment describes the device as being a handheld calculator, the invention can be applied to additional embodiments. For example, the handheld buttons can be incorporated into other handheld devices such as but not limited to cellular phones, IPODs, and/or other types of wireless type handheld devices. Additionally, the invention can be part of a computer program that can be distributed by a CD, floppy disk, and/or be down loaded through the (worldwide web) internet, so that a keypad on a personal computer, desktop computer, laptop, and the like, can be used. The program can be used as part of a subscriber based financial planning service.

The color coded buttons in the program are factory pre-set and pre-programmed so that the user can not modify their features, and cannot modify the calculations. Thus, the handheld color buttons are restricted to only the use described. The rest of calculator buttons (i.e. arithmetic, integer numbers . . . ) can be used for standard ten key calculator functions without having to access the color coded buttons.

While the invention has been described, disclosed, illustrated and shown in Various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A method of using a pre-programmed calculator device to calculate future or present amounts of an amount value solely for financial planning with a pre-programmed set of input depressible switches, consisting of the steps of:

providing a single housing with a pre-programmed calculator-computer having a single display screen with a series of pre-programmed input and depressible switches of a single color, the housing being adapted to be used by a single hand;

first entering a first year annual amount value from a plurality of multiple sources, with a first input switch on the single display screen, the multiple sources selected from the group consisting of: annual expenses, annual investment amount, annual college cost, annual social security benefit, annual income from part-time work, annual pension amount, annual health care costs, annual mortgage expense, annual rental income and annual maintenance costs;

second entering a percent of increase per year of the annual amount value with a second input switch on the single display screen, each of the plurality of the multiple sources having their own selected percent increase per year, the increase per year being selected from the group consisting of; annual rate of increase in investment amounts, increase in annual spending, increase in cost of college, increase in health care costs and expenses, increase in pension, and increase in social security;

third entering the selected number of years for the annual amount value with a third input switch on the single display screen, for each annual amount value, the selected number of years being selected from a group consisting of: years of investment, years of annual spending, years of college, years of health care costs and expenses, years of pension, and years of social security;

fourth entering the rate of return of the annual amount value with a fourth input switch on the single display screen; and calculating another amount value, the another amount value being a present amount of the amount value or a future amount of the amount value, the present amount being amounts that would need to be invested to generate a selected stream of income based on the values entered with the first input switch, the second input switch, the third input switch and the fourth input switch, the calculating being done with a fifth input switch on the single display screen, wherein the method is used for calculating financial planning results solely by entering data with the first, the second, the third, the fourth and the fifth input depressible switches of the pre programmed device, so that the method steps are solely used with the single display in the housing without additional resources to provide financial planning data for a user over multiple years.

2. The method of claim 1, wherein the single display is a portable handheld housing for supporting the single screen display, the pre-programmed computer and the first, the second, the third, the fourth and the fifth input switches thereon.

3. A method for calculating financial information utilizing a pre-programmed calculator device to calculate a first year withdrawal amount for financial planning, consisting of the steps of:

providing a single display screen with a single pre-programmed computer on a housing, the single display screen having a series of pre-programmed input switches of a single color, the housing being adapted to be used by a single hand;

first entering an available funds value from a plurality of multiple sources, with a first input switch on the single display screen, the multiple sources selected from the group consisting of: expenses, investment amount, college cost, social security benefit, income from part-time work, pension amount, health care costs, mortgage expense, rental income and maintenance costs;

second entering a percent increase per year of a selected withdrawal value, with a second input switch on the single display screen, each of the plurality of the multiple sources having their own selected percent increase per year, the increase per year being selected from the group consisting of; annual rate of increase in investment amounts, increase in annual spending, increase in cost of college, increase in health care costs and expenses, increase in pension, and increase in social security;

third entering selected number of years the available funds value will last with a third input switch on the single display screen;

fourth entering the rate of return of the amount with a fourth input switch on the single display screen; and calculating a first year withdrawal amount with a fifth input switch on the single display screen based on the number of years the available funds value will last and on the present increase per year of the selected withdrawal value, wherein the method is used for calculating financial planning results solely by entering data with the first, the second, the third, the fourth and the fifth input switches of the pre-programmed device without additional resources to provide financial planning data for a user to determine future withdrawal amounts.

4. The method of claim 3, wherein the single display is a portable handheld housing for supporting the single screen display, the pre-programmed computer and the first, the second, the third, the fourth and the fifth input switches thereon.

* * * * *